(12) United States Patent
Yassa et al.

(10) Patent No.: US 9,959,270 B2
(45) Date of Patent: *May 1, 2018

(54) METHOD AND APPARATUS TO MODEL AND TRANSFER THE PROSODY OF TAGS ACROSS LANGUAGES

(71) Applicant: SPEECH MORPHING SYSTEMS, INC., San Jose, CA (US)

(72) Inventors: Fathy Yassa, Soquel, CA (US); Caroline Henton, San Jose, CA (US); Meir Friedlander, Palo Alto, CA (US)

(73) Assignee: SPEECH MORPHING SYSTEMS, INC., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/225,099

(22) Filed: Aug. 1, 2016

(65) Prior Publication Data

US 2016/0343368 A1 Nov. 24, 2016

Related U.S. Application Data

(63) Continuation-in-part of application No. 13/744,391, filed on Jan. 17, 2013, now Pat. No. 9,418,655.

(51) Int. Cl.
*G06F 17/27* (2006.01)
*G06F 17/28* (2006.01)
*G10L 13/033* (2013.01)
*G10L 21/013* (2013.01)
*G10L 25/90* (2013.01)

(52) U.S. Cl.
CPC ........ *G06F 17/274* (2013.01); *G06F 17/2775* (2013.01); *G06F 17/289* (2013.01); *G10L 13/0335* (2013.01); *G10L 21/013* (2013.01); *G10L 25/90* (2013.01)

(58) Field of Classification Search
CPC .................................................... G06F 17/274
USPC ............................................................ 704/277
See application file for complete search history.

(56) References Cited

U.S. PATENT DOCUMENTS

| | | | |
|---|---|---|---|
| 7,496,498 | B2 | 2/2009 | Chu et al. |
| 8,073,696 | B2 | 12/2011 | Kato et al. |
| 8,321,225 | B1 | 11/2012 | Jansche et al. |
| 8,401,849 | B2 | 3/2013 | Chandra et al. |
| 8,886,539 | B2 | 11/2014 | Chen |
| 9,093,067 | B1 | 7/2015 | Jansche et al. |
| 9,195,656 | B2 | 11/2015 | Fructuoso et al. |
| 9,418,655 | B2 * | 8/2016 | Yassa ...................... G10L 13/00 |

* cited by examiner

*Primary Examiner* — Susan McFadden
(74) *Attorney, Agent, or Firm* — Sughrue Mion, PLLC

(57) ABSTRACT

A method for determining the prosody of a tag question in human speech and preserving said prosody as the human speech is translated into a different language.

17 Claims, 2 Drawing Sheets

METHOD AND APPARATUS TO MODEL AND TRANSFER THE PROSODY OF TAGS ACROSS LANGUAGES

CROSS-REFERENCE TO RELATED APPLICATIONS

The present application is a continuation-in-part of U.S. application Ser. No. 13/744,391 filed on Jan. 17, 2013, in the United States Patent and Trademark Office, the disclosure of which is incorporated herein by reference in its entirety.

BACKGROUND

1. Field

In linguistics, prosody is concerned with those elements of speech, which are not individual phonetic segments (vowels and consonants), but are properties of syllables and larger units of speech. Such elements of speech contribute to linguistic functions such as intonation, tone, stress and rhythm. Prosody may reflect various features of the speaker or the utterance: the emotional state of the speaker; the form of the utterance (statement, question, or command); the presence of irony or sarcasm; emphasis, contrast, and focus; or other elements of language that may not be encoded by grammar or by choice of vocabulary. Prosody is neither completely universal nor automatic, but rather is expressed through the prosodic structure of each language.

2. Description of Related Art

Automatic speech recognition (ASR) can be defined as the independent, computer-driven transcription of spoken language into readable text in real time. In other words, ASR is technology that allows a computer to identify the words that a person speaks and convert the identified words to text.

Speech synthesis is the artificial production of human speech. A computer system used for this purpose is called a speech computer or speech synthesizer, and can be implemented in software or hardware. A text-to-speech (TTS) system converts normal language text into speech.

Synthesized speech can be created by concatenating pieces of recorded speech stored in a database. Systems differ in the size of the stored speech units. A system that stores phones or diphones provides the largest output range, but may lack clarity. For specific usage domains, the storage of entire words or sentences allows for high-quality output. Alternatively, a synthesizer can incorporate a model of the vocal tract and other human voice characteristics to create a completely "synthetic" voice output.

SUMMARY

Embodiments of the present disclosure relate to the linguistic viability of mapping the prosodic contours of tag questions in a first language (L1) to the prosodic contours of tag questions as the prosodic contours are realized grammatically in a second language (L2).

Embodiments of the present disclosure improve the naturalness of the prosody of tags in synthetic speech produced as result of translating from spoken input of the first language to spoken (synthetic) output in the second language.

According to an aspect of an embodiment of the present disclosure, there is provided a method of mapping prosodic contours, the method including a person speaks in a first language, speech in the first language is recognized (by ASR, or manual), searching the speech for a known tag, such as tag questions at the end, embedded, attributive tags in the middle, etc., searching for pieces of text that have common consistent or idiomatic intonation patterns (e.g. items in a list), translating the text into a second language, examining the second language string to find the portions of the translated text that correspond to the tag(s), examining the speech signal of the original first language, to find the segments that correspond to the tag, extracting the fundamental frequency (pitch) from those segments, and fitting a smooth contour such as a cubic spline to the segments to smooth over the segmental perturbations, voiceless regions, and extraction errors, mapping a stylized smooth contour into the corresponding part of the pitch range of the intended second language synthesized speech, stretching or contracting a stylized smooth contour over time because the duration of the translation will be different, and aligning the contour with the corresponding second language segments and impose the contour on the synthesized second language speech.

Aspects of the embodiments of the present disclosure overcome the above disadvantages and other disadvantages not described above. However, aspects of the embodiments are not required to overcome the disadvantages described above, and aspects of the embodiments of the present disclosure might not overcome any of the problems described above.

DETAILED DESCRIPTION OF THE EXEMPLARY EMBODIMENTS

Figure 1:
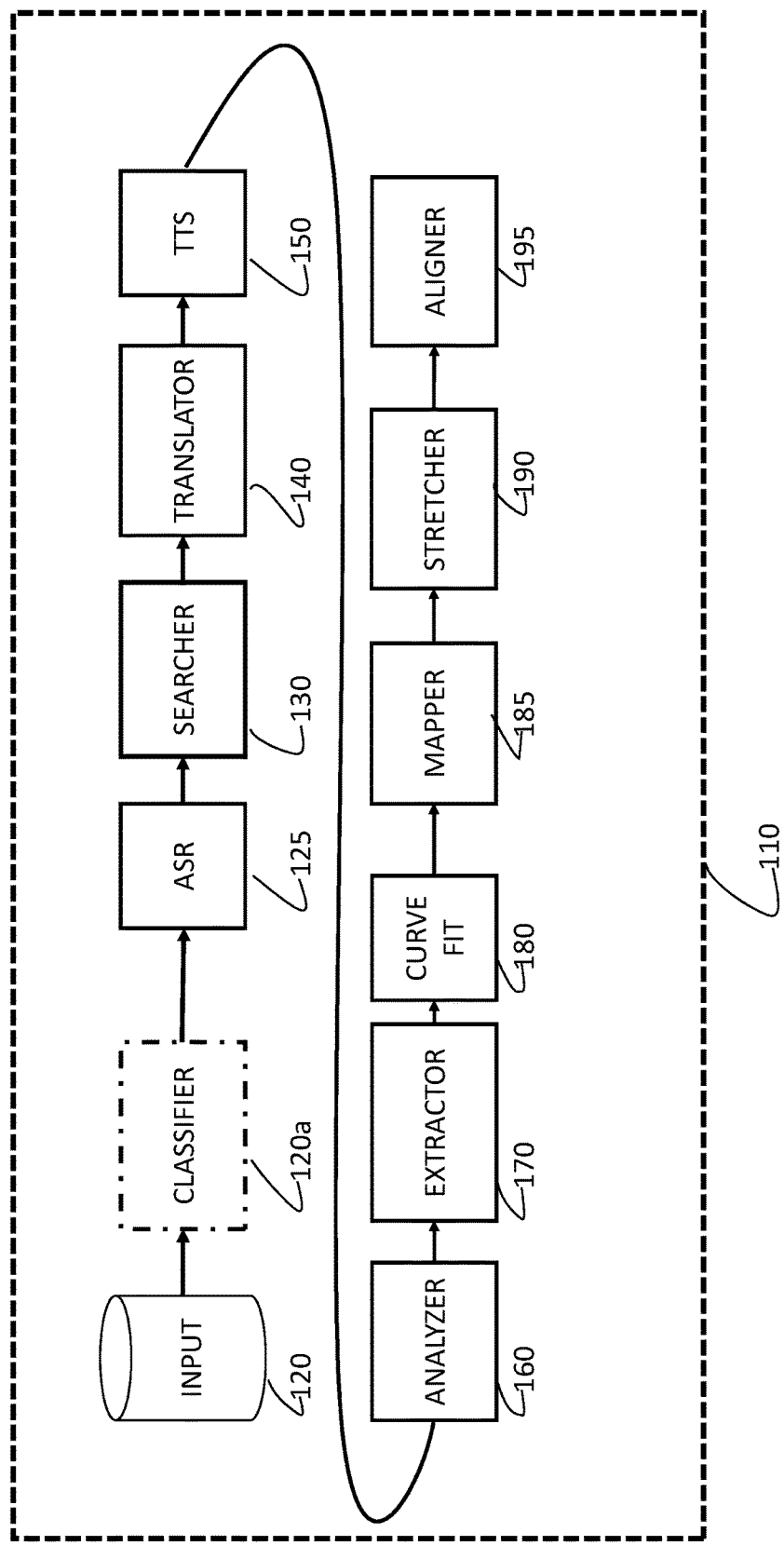
FIG. 1 illustrates a block diagram of a computer system for modeling and transferring prosody of tags across one or more languages, according to an exemplary embodiment.

In this case, a firs language (L1) is U.S. English. Spoken input of the first language is fed into an Automatic Speech Recognition (ASR) system, which analyzes and recognizes the speech, and outputs both English text and measurements of the prosodic parameters used by the speaker. These prosodic parameters include pitch, pitch range, variability within that range, and speech rate. The text is then translated into the second language, and that resultant text is fed into a text-to-speech (TTS) system for output in the target language.

The prosodic information captured from the input language is then mapped, or splined, to the tag component of the target language. The tag components of the second language will vary in both length (number of words/syllables) and complexity compared with the structure of tag questions in English. Regardless of the comparative complexity of tags in the second language, the prosodic information that has been obtained from the ASR analysis can be mapped to the tag component of the target language, to ensure that the semantic and pragmatic intent of the tag question is conveyed correctly in the target language.

For the purposes of illustration here, L1 is General American English (US English) and the first the second language is Parisian French.

The second stage is to extend this method to a second, different second language: German (Hochdeutsch). The same methods can be applied to representative languages from other major world language groups, namely Russian, Arabic, and Japanese. These structurally diverse languages show the possibilities of this method being applied in five major world language groups: Germanic, Romance, Semitic, Slavonic, and Japanese.

LINGUISTIC BACKGROUND, DEFINITIONS, AND EXAMPLES

A question tag or tag question is a grammatical structure in which a declarative statement or an imperative is turned into a question by adding an interrogative fragment (the 'tag'). For example, in the sentence, "It's Monday today, isn't it?", the statement, "It's Monday today," is turned into a question by the tag, "isn't it?".

In most languages, tag questions are more common in colloquial spoken usage than in formal written usage. They can be an indicator of politeness, emphasis or irony. Tags may suggest confidence, or lack of confidence; they may be confrontational, defensive or tentative. Although they have the grammatical form of a question, they differ from What questions in that they do not expect an answer. In other cases, when they do expect a response, they may differ from straightforward questions in that they cue the listener about what response is expected.

Question tags are formed in several ways, and many languages give a choice of formation. In some languages, the most common is a single word or fixed phrase, whereas in others it is formed by a regular grammatical construction.

In many languages, the question tag is a simple positive or negative. Russian allows da?, yes?, whereas Spanish and Italian use ¿no? and no?, respectively. Another common one-word tag formation is equivalent to the English correct? or the informal form right?. This is realized more often as the word for true or truth, such as in Poli shprawda?, or Spanish ¿verdad?, which in turn can be presented in a negative form, such as in the Polish nieprawda?.

Alternatively, a word or short phrase indicating agreement can be used, such as the French d'accord?. However, the equivalent in many languages is not a true tag question, but rather a complete question.

A plain conjunction may be used, such as the Czech e? (that).

Various other words occur in specific languages, such as German oder? (or).

Finally, some languages have words whose only function is as a question tag. In Scots and Canadian English, eh? functions this way. French has hein? and German has gell?

In several languages, the tag question is built around the standard/regular interrogative form. In English and the Celtic languages, this interrogative agrees with the verb in the main clause, whereas in other languages the structure has fossilized into a fixed form or phrase.

French uses n'est-cepas in the formal register; and German uses nicht wahr in the formal register. Some languages use fixed questions, often involving one of the words found in single-word tags, such as the Russian (Roman transliteration) ne pravda li? (is it not true?). Alternatively, they may use a form such as the Russian (Roman transliteration) ne tak li? (is it not so/like that?).

Another grammatically regular tag is the simple question marker. In Polish, this is used in the negative, giving czyz nie?.

Grammatically productive tag forms are formed in the same way as simple questions, referring back to the verb in the main clause and agreeing in time and person (where the language has such agreement). The tag may include a pronoun, such as in English, or may not, as is the case in Japanese. If the rules of forming interrogatives require, the verb in the tag may be an auxiliary, as in English.

English tag questions, when taking the grammatical form of a question, are atypically complex, because they vary according to four factors: the choice of auxiliary, the negation, the intonation pattern and the emphasis.

The English tag question is made up of an auxiliary verb and a pronoun. The auxiliary has to agree with the tense, aspect and modality of the verb in the preceding sentence. If the verb is in the present perfect, for example, the tag question uses has or have; if the verb is in a present progressive form, the tag is formed with am, are, is; if the verb is in a tense which does not normally use an auxiliary, like the present simple, the auxiliary is taken from the emphatic do form; and if the sentence has a modal auxiliary, this is echoed in the tag:

She's read this book, hasn't she?
She read this book, didn't she?
She's reading this book, isn't she?
She reads a lot of books, doesn't she?
She'll read this book, won't she?
She should read this book, shouldn't she?
She can read this book, can't she?

English tag questions may contain a negation, but need not do so. When there is no special emphasis, the rule of thumb often applies that a positive sentence has a negative tag and vice versa. This form usually seeks confirmation of the questioner's opinion or belief, for example:

She is French, isn't she?
She's not French, is she?

These are sometimes called 'balanced tag questions'. However, it has been estimated that in normal conversation, as many as 40%-50% of tags break this rule. 'Unbalanced tag questions' (positive to positive or negative to negative) may be used for ironic or confrontational effects, for example:

Do listen, will you?
Oh, I'm lazy, amI?
Jack: I refuse to spend Sunday at your mother's house! Jill: Oh you do, do you? We'll see about that!
Jack: I just won't go back! Jill: Oh you won't, won't you?

Intonation of Tags

English tag questions can have a rising or a falling intonation pattern. Intonation patterns are realized acoustically by changes in the pitch, pitch range and rate of speech. The option for English tags to fall is contrasted with Polish, French or German, for example, where all tags rise.

As a rule, the English rising pattern is used when soliciting information or motivating an action, that is, when some sort of response is required. Since normal English yes/no questions have rising patterns (e.g. Are you coming?), these tags make a grammatical statement (declarative) into a real question (interrogative), for example:

You're coming, aren't you?
Do listen, will you?
Let's have a beer, shall we?

The falling pattern is used to underline a statement. The statement itself ends with a falling pattern, and the tag sounds like an echo, strengthening the pattern. Most English tag questions have this falling pattern.

He doesn't know what he's doing, does he?
This is really boring, isn't it?

Sometimes the rising tag goes with the positive-to-positive pattern to create a confrontational effect:

He was the best in the class, was he?

Rising intonation: the speaker is challenging this thesis, or perhaps expressing surprised interest.

He was the best in the class, wasn't he?
Falling intonation: the speaker holds this opinion.
Be careful, will you?
Rising intonation: expresses irritation.
Take care, won't you?
Falling intonation: expresses concern.
Sometimes the same words may have different patterns depending on the situation or implication.
You don't remember my name, do you? (rising: expresses surprise)
You don't remember my name, do you? (falling: expresses amusement or resignation)
Your name's Mary, isn't it? (rising: expresses uncertainty)
Your name's Mary, isn't it? (falling: expresses confidence)
It is interesting that as an all-purpose tag the Multicultural London English set-phrase innit (for "isn't it") is only used with falling patterns:
He doesn't know what he's doing, innit?
He was the best in the class, innit?
On the other hand, the adverbial tag questions (alright? OK? right? etc.) are almost always found with rising patterns. An occasional exception is surely.
We're going to the pub, alright?
I'll be coming home late, OK?
You're not wearing that sweater, surely?
Attributive tags also exist in all languages. They perform the role of indicating the source of the information just presented and take the form of an intermediate or final verb phrase attribution, for example:
"She's read this book", he said.
"She's read this book", he said, "and she didn't like it".
The intonation of attributive tags, whether embedded or not, is always falling.

Translation Examples: English to French

In the examples below, the numbering corresponds to that for the English examples above. Some of the English examples cannot be rendered well by translation into French, German or Russian and have been omitted from the lists below.
1. Elle a lu ce livre, n'est-ce pas?
2. Elle a lu ce livre, n'est-ce pas?
3. Elle lit ce livre, n'est-ce pas?
4. Elle lit beaucoup de livre, n'est-ce pas?
5. Elle va lire ce livre, n'est-ce pas?
6. Elle devrait lire ce livre, n'est-ce pas? 7. Il peut lire ce livre, n'est-ce pas?
8, Elle est français, n'est-ce pas?
9. Elle n'est pas français, n'est-ce pas?
10. Écoute, d'accord?
11. Oh, je suis paresseux, hein?
17. Il ne sait pas ce qu'il fait, n'est-ce pas?
18. C'est vraiment ennuyeux, n'est-ce pas?
19. Il était le meilleur dans la classe, n'est-ce pas?
20. Il était lemeilleur dans la classe, n'est-ce pas?
*21. Soyez prudent, hein?
23. Vous ne me souviens pas mon nom, n'est-ce pas? 25. Votre nom et Mary, n'est-ce pas?
29. Nous allons au pub, d'accord?
30. Je serai rentre tard, OK?
31, Vous ne portez pas ce chandail, sûrement?
*32. "Elle a lu ce livre", at-il dit.

*33. "Elle a lu ce livre", il a dit, "et elle n'aimait pas ça."

Translation Examples: English to German

1. Sie hat dieses Buch gelesen, nicht wahr?
2. Sie las dieses Buch, nicht wahr?
3. Sie liest dieses Buch, nicht wahr?
4. Sie liest viele Bücher, nicht wahr?
5. Sie wird dieses Buch lesen, nicht wahr?
6. Sie sollten dieses Buch lesens nicht wahr?
7. Sie können dieses Buch lesen, nicht wahr?
8. Sie ist französisch, nicht wahr?
9, Sie ist nicht französisch, oder?
10. Hören Sie gel?
11. Oh, ich bin faul, oder?
17. Er weiß nicht, was er tut, oder?
18. Das ist wirklich langweilig, nicht wahr?
19. Er war der beste in der Klasse, nicht wahr?
20. Er war der beste in der Klasse, nicht wahr?
21. Seien Sie vorsichtig, ja?
23. Du erinnerst dich nicht mein Name, nicht wahr?
25. IhrName ist Mary, nicht wahr?
29. Wir gehen in die Kneipe, gel?
30. Ich werde nach Hause kommen zu spat, okay?
31. Du trägst nicht die Pullover, oder? 32. "Sie hat dieses Buch gelesen", sagte er.
33. "Sie hat dieses Buch gelesen", sagte er, "und sie hatte es nicht gern,"

Both English text and measurements of the prosodic parameters used by the speaker. These prosodic parameters include pitch, pitch range, variability within that range, and speech rate. The text is then translated into the second language, and that resultant text is fed into a text-to-speech (TTS) system for output in the target language.

The prosodic information captured from the input language is then mapped, or splined, to the tag component of the target language. The tag components of the second language will vary in both length (number of words/syllables) and complexity compared with the structure of tag questions in English. Regardless of the comparative complexity of tags in the second language, the prosodic information that has been obtained from the ASR analysis can be mapped to the tag component of the target language, to ensure that the semantic and pragmatic intent of the tag question is conveyed correctly in the target language.

For the purposes of illustration here, the first language is General American English (U.S. English) and the first the second language is Parisian French. The second stage is to extend this method to a second, different the second language: German (Hochdeutsch). The same methods can be applied to representative languages from other major world language groups, namely Russian, Arabic, and Japanese. These structurally diverse languages show the possibilities of this method being applied in five major world language groups: Germanic, Romance, Semitic, Slavonic, and Japanese.

FIG. 1 illustrates a block diagram of a system for transferring the prosody of tags from one language to another. The prosody of tags transfer system in FIG. 1 may be implemented as a computer system 110; a computer comprising several modules, i.e. computer components embodied as either software modules, hardware modules, or a combination of software and hardware modules, whether separate or integrated, working together to form an exemplary computer system. The computer components may be implemented as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Input 120 is a module configured to receive human speech in a first language from any audio source and output the received speech to Computer System 110. Input 120 may be a live speaker, a module configured to stream audio, a feed from a videoconference with audio, a module configured to download or store audio or audio files. Computer System 110 is the computer system described above. In one embodiment, the computer system optionally includes Classifier 120a, a module configured to analyze the human speech outputted from Input 120 and assign the speaker into one or more categories such as age, gender and accent. ASR 125 is a module configured to receive the output human speech from Input 120, analyze the speech in the first language using automatic speech recognition, extract the prosodic parameters of said human speech and output the text transcription of said human speech. Based on the classification optionally performed by Classifier 120a, ASR 125 may determine which acoustic and prosodic models are likely to produce the most accurate text and prosodic transcriptions.

Searcher 130 is a module configured to search the text transcription of the human speech and locate one or more tag questions in said text transcriptions.

Translator 140 is a module configured to translate the text transcriptions of said human speech into a second language and output said translated text transcription to Computer System 110.

Text-to-speech (TTS) 150 is a module configured to output said speech in a second language that is translated from the speech in the first language based on the translated text in the second language.

Analyzer 160 is a module configured to analyze the speech in the first language to find speech segments that correspond to the tag question in the first language. In one embodiment, Analyzer 160 uses specific acoustic and/or prosodic models based upon the classification by Classifier 120a. In another embodiment, the prosodic model is an informal spoken prosodic model, i.e. a prosodic model built on the rhythms and patterns of stress in informal speech. For example, one common difference between formal and informal speech is the speed of delivery. Informal speech tends have a fast speed of delivery in informal conversation style as compared to the relatively slow tempo of informal speech.

Extractor 170 is a module configured to extract a fundamental frequency from the speech segments that correspond to the tag question in the first language based on the extracted prosodic parameters of the speech in the first language.

CurveFit 180 is a module configured to fit a stylized smooth contour to said fundamental frequency that was extracted from the speech segments which correspond to the tag question in the first language.

Mapper 185 is a module configured to map said stylized smooth contour into a corresponding part of pitch range of the speech in the second language which was translated from the first language.

Figure 2:
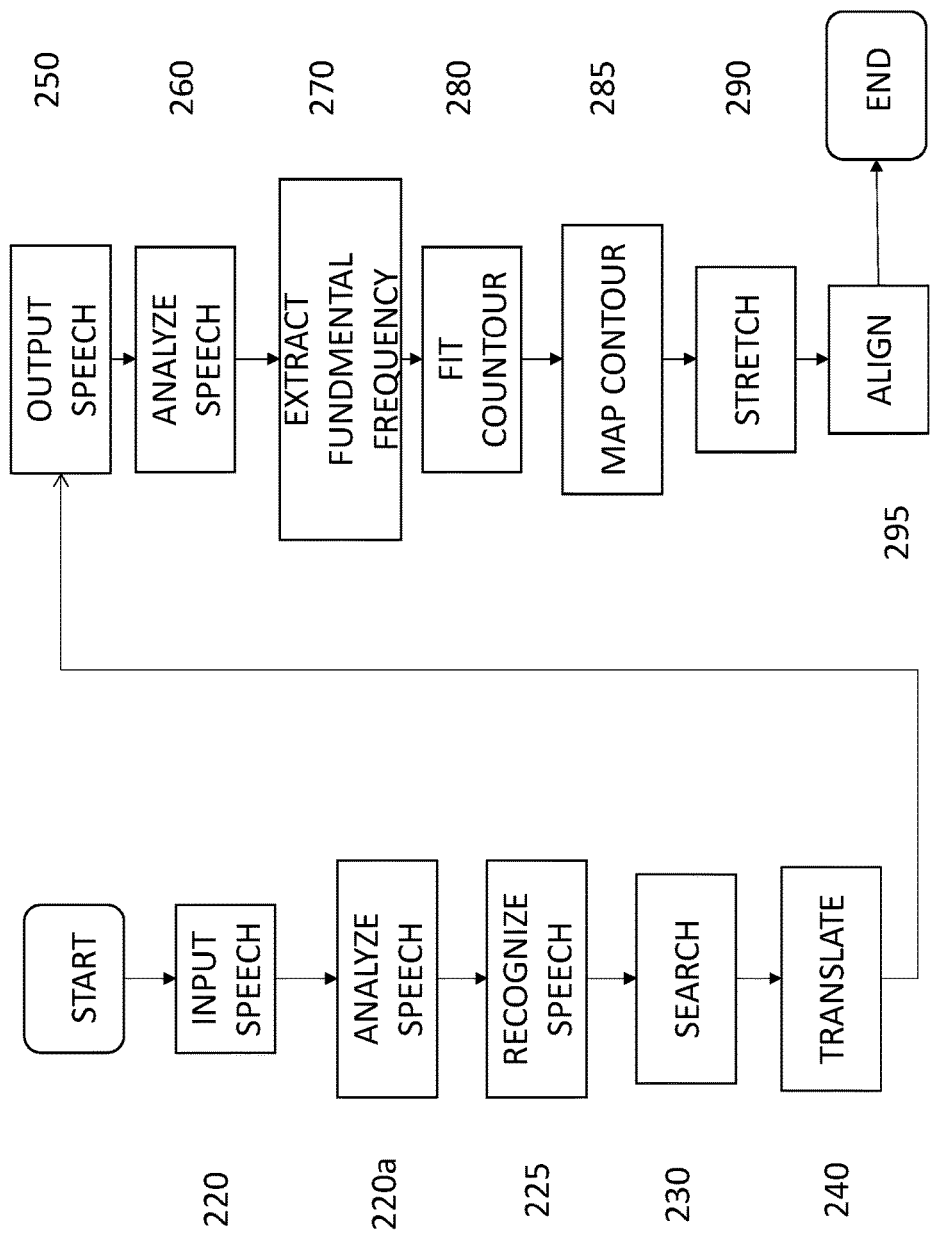
FIG. 2 illustrates a flow diagram for a method of transferring prosody of tags across one or more languages, according to an exemplary embodiment.

Stretcher 190 is a module configured to stretch or contract the stylized smooth contour over time;

Aligner 195 is a module configured to align the stylized smooth contour with corresponding speech segments in the second language that correspond to the tag questions; and apply the smooth contour to the speech in the second language;

FIG. 2 illustrates a flow diagram of a method for transferring the prosody of tags across languages. At step 220, Input 120 obtains human speech in a first language which may be from a live speaker, a module configured to stream audio, a feed from a videoconference with audio, a module configured to download or store audio or audio files. At step 220a, Classifier 220a analyzes the speech and assigned the speaker into one or more categories such as age, gender and accent. At step 225, ASR 125 recognizes the speech, i.e. analyze the speech in the first language using automatic speech recognition, extracts the prosodic parameters of said human speech and outputs the text transcription of said human speech. The text transcriptions of the human speech are searched by Searcher 130 at step 230 to locate one or more tag questions. At step 240, the text transcripts of said human speech are translated by Translator 140 into a second language and outputted to Computer System 110. At step 250, TTS 150 outputs said speech in a second language that is translated from the speech in the first language based on the translated text in the second language.

At step 260, Analyzer 160 analyzes the speech in the first language to find speech segments that correspond to the tag question in the first language. In one embodiment, Analyzer 160 uses specific acoustic and/or prosodic models based upon the classification by Classifier 120a. In another embodiment, the prosodic model is an informal spoken prosodic model, i.e. a prosodic model built on the rhythms and patterns of stress in informal speech.

At step 270, Extractor 170 extracts a fundamental frequency from the speech segments that corresponds to the tag question in the first language based on the extracted prosodic parameters of the speech in the first language.

At step 280, CurveFit 180 fits a stylized smooth contour to said fundamental frequency that was extracted from the speech segments which correspond to the tag question in the first language.

At step 285, Mapper 185 maps said stylized smooth contour into a corresponding part of pitch range of the speech in the second language which was translated from the first language.

At step 290, Stretcher 190 stretches or contracts the stylized smooth contour over time. At step 295, Aligner 195 aligns the stylized smooth contour with corresponding speech segments in the second language that correspond to the tag questions; and applies the smooth contour to the speech in the second language.

What is claimed is:
1. A method to model and transfer prosody of tag questions across languages, the method comprising:
receiving speech of a first person speaking in a first language;
analyzing the speech in the first language using automatic speech recognition;

extracting prosodic parameters of the speech in the first language and outputting text in the first language corresponding to the speech in the first language based on the analyzing;

searching the speech in the first language for a tag question in the first language;

translating the text in the first language to text in a second language;

outputting translated speech in the second language that is translated from the speech in the first language based on the translated text in the second language;

analyzing the speech in the first language to find speech segments that correspond to the tag question in the first language;

extracting a fundamental frequency from the speech segments that correspond to the tag question in the first language;

fitting a stylized smooth contour to the fundamental frequency;

mapping the stylized smooth contour into a corresponding part of pitch range of the speech in the second language;

extracting a fundamental frequency from the speech segments that correspond to the tag question in the first language;

extracting a fundamental frequency from the speech segments that correspond to the tag question in the second language based on the extracted prosodic parameters of the speech in the first language;

stretching or contracting the stylized smooth contour over time;

aligning the stylized smooth contour with corresponding speech segments in the second language that correspond to the tag question; and applying the smooth contour to the speech in the second language.

2. The method of claim 1, wherein the stylized smooth contour is a cubic spline.

3. The method of claim 1, wherein the first language is English.

4. The method of claim 3, wherein the second language is a language other than English.

5. The method of claim 1, wherein the tag question is a grammatical structure in which the declarative statement or an imperative forms a question by adding an interrogative fragment.

6. The method of claim 1, wherein the prosodic parameters comprise at least one of pitch, pitch range, variability within the pitch range and speech rate.

7. The method of claim 1, further comprising classifying the speech based upon the characteristics derived from the speech.

8. The method of claim 7, wherein the speech spoken by the first person in the first language is analyzed with an acoustic model based on the classification of the speech.

9. The method of claim 7, wherein the speech spoken by the first person in the first language is analyzed with a prosodic model based on the classification of the speech.

10. The method of claim 7, wherein the speech spoken by the first person in the first language is analyzed with both an acoustic model based on the classification of the speech and a prosodic model based upon the classification of the speech.

11. The method of claim 9, wherein the prosodic model based on the classification of the speech is an informal spoken prosodic model.

12. The method of claim 10, wherein the prosodic model based on the classification of the speech is an informal spoken prosodic model.

13. The method of claim 7, wherein the analyzing of the speech in the first language to find speech segments corresponding to the tag question in the first language is performed using an acoustic model based on the classification of the speech.

14. The method of claim 7, where the analyzing of the speech in the first language to find speech segments corresponding to the tag question in the first language is performed using a prosodic model based on the classification of the speech.

15. The method of claim 14, wherein the prosodic model based on the classification of the speech is an informal spoken prosodic model.

16. The method of claim 7, where the analyzing of the speech in the first language to find speech segments corresponding to the tag questions in the first language is performed using an acoustic model based on the classification of the speech and a prosodic model based on the classification of the speech.

17. The method of claim 16, wherein the prosodic model based on the classification of the speech is an informal spoken prosodic model.

* * * * *